Patented Sept. 9, 1941

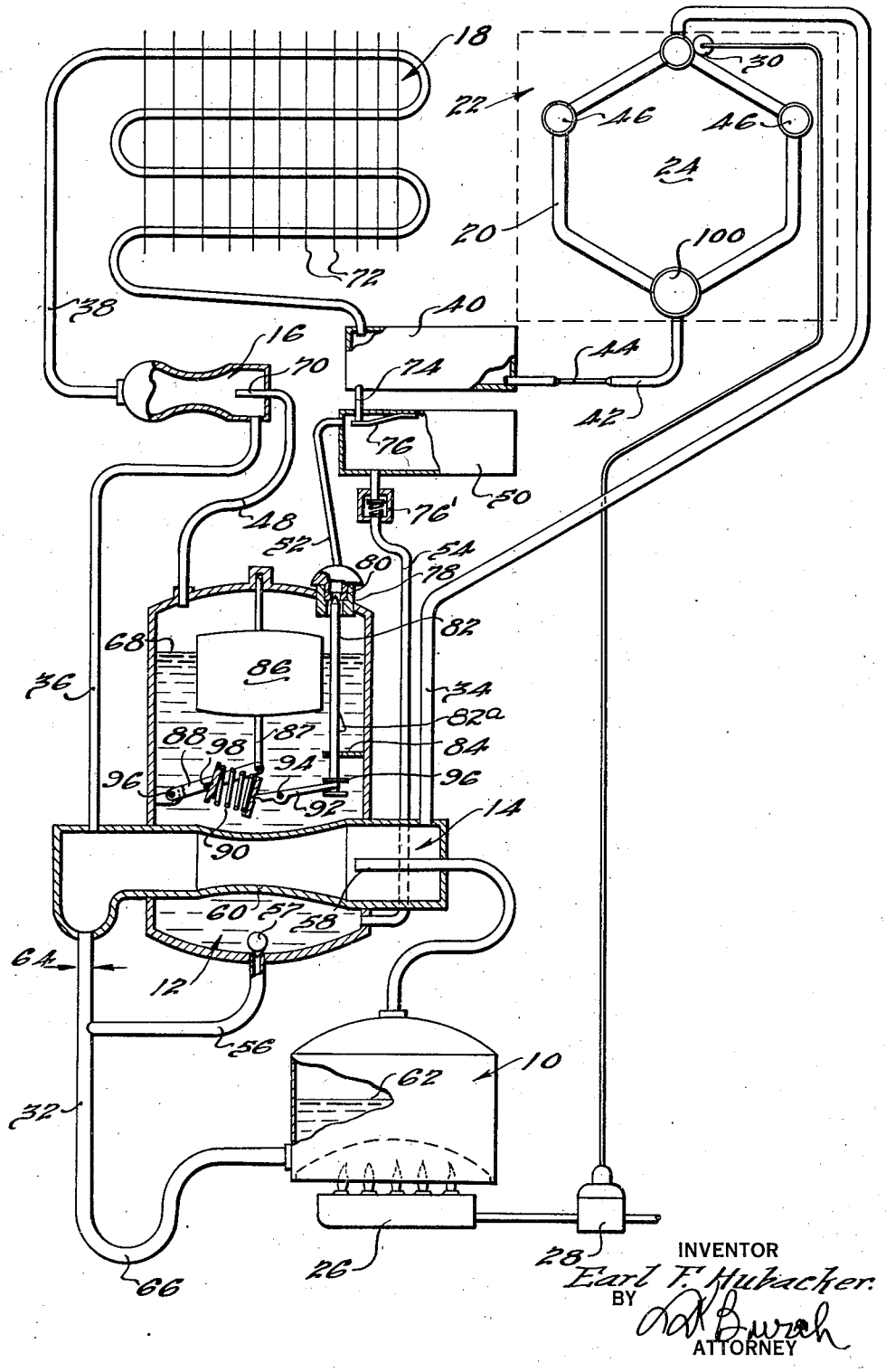

2,255,586

UNITED STATES PATENT OFFICE 2,255,586

HEAT TRANSFER SYSTEM

Earl F. Hubacker, Highland Park, Mich., assignor to Borg-Warner Corporation, Chicago, Ill., a corporation of Illinois Application February 24, 1939, Serial No. 258,209

8 Claims. (Cl. 62—115)

This invention relates to the art of refrigeration and has particular reference to novel methods of and apparatus for effecting the transfer of heat and which are particularly suitable for use in domestic refrigerators.

In the systems using heat as a source of energy for operating the same and as heretofore known, it is difficult, if not impossible, to obtain the desired efficiency in such systems due principally to the fact that it is necessary not only to dissipate the heat absorbed by the cooling element of the system but also to dissipate the heat added to the system as a result of using a source of heat as a motivating force for the system.

This invention has as a principal object, the provision of an improved form of heat transfer system of either the injector or the absorption type and in which means are provided for more efficiently utilizing the heat added to the system for operating the same.

Another object of the invention is to provide a new and improved form of means for effecting the transfer of fluid between the different parts of the system.

Another object of the invention is to provide a new and improved form of injector or absorption heat transfer system and which is automatically self-regulating and in which the efficiency is such as to permit the use of an air cooled condenser.

Another object of the invention is to provide a new and improved form of heat transfer system of either the injector or absorption type with primary and secondary boilers, heat from an external source being supplied to the primary boiler and the secondary boiler being supplied with heat from within the system.

Another object of the invention is to provide a novel form of heat transfer system of the injector type wherein a float operated transfer device is utilized for effecting the transfer of fluid back to the boiler system at periodic intervals.

Another object of the invention is to provide a new and improved system of heat transfer of the injector type wherein two injectors are arranged in series and wherein both of the injectors are operated by application of an external source of heat to a single boiler.

Another object of the invention is to provide a new and improved system of heat transfer of the injector type and wherein use is made of a binary fluid.

Another object of the invention is to provide a new and improved form of absorption system of the continuous two pressure type, having a plurality of boilers with an external source of heat associated with one of the boilers and wherein the latent heat of the refrigerant vapor generated in the first boiler is utilized as the source of heat for the secondary boiler.

Other objects of the invention will be apparent from the consideration of the following specification taken in conjunction with the accompanying drawing, of which there is one sheet and wherein the figure is a diagrammatic view of an injector system embodying my invention.

Referring to the drawing, there is illustrated diagrammatically a heat transfer system of the injector type and which, as illustrated, consists of a primary boiler 10, a secondary boiler 12, primary and secondary injectors 14 and 16, respectively, a condenser or heat dissipating element 18 and a heat absorbing element or evaporating element 20. When this system is used as a part of a domestic refrigerator, the evaporator 20 may be arranged in an insulated compartment 22 and formed to provide a space 24 internally thereof, adapted for receiving liquid holding trays so as to freeze the liquid therein and to provide a relatively large surface on the outside of such evaporator over which the air in such compartment will pass for the purpose of removing heat therefrom.

Heat may be supplied to the primary boiler 10 by a heating element 26, such as a gas burner and under the control of a thermostatic control valve 28. The thermostatic valve 28 includes a thermo-responsive element 30 thermally associated with the evaporator 20. The thermostatic control valve 28 may be set so as to pass a predetermined amount of gas at all times in order to support a low flame by the burner 26. When the temperature of the evaporator 20 rises above a pre-selected degree, the valve 28 will open to pass a predetermined larger quantity of gas so as to support a high flame at the burner 26, or the valve 28 may operate to modulate the gas supply above a predetermined minimum and in accordance with the temperature of the evaporator 20. When the temperature of the evaporator 20 drops below the temperature setting of the valve 28, such valve will operate to cut the supply of gas to the burner down to the minimum.

The system comprises several circuits, the first of which includes the primary boiler 10, the primary injector 14 and a connection 32 for returning fluid after the performance of work thereby to the primary boiler 10. For convenience, this circuit may be designated as the primary boiler circuit.

Another circuit includes the evaporator 20, primary injector 14, a connection 34 between the primary injector 14 and the evaporator 20 for supplying refrigerant vapor to the primary injector, a connection 36 between the primary injector and the secondary injector 16, a connection 38 between the secondary injector and condenser 18, the condenser 18, a liquid receiver 40 connected to the tail end of the condenser 18 so as to be supplied with liquid refrigerant therefrom and a connection 42 between the receiver 40 and the evaporator 20 for supplying liquid refrigerant to the evaporator 20. The connection 42 preferably includes a refrigerant expansion control such as a capillary tube 44, said tube being of such capacity as to meter liquid refrigerant to the evaporator 20 in accordance with the demands thereon and so as to maintain a liquid level in the evaporator at approximately the level of the headers 46. This circuit may be designated as the evaporator circuit.

Another circuit includes the secondary boiler 12, a connection 48 between the vapor space therein and the secondary injector 16, the connection 38, the condenser 18, the receiver 40, a secondary receiver 50, a valve controlled vent 52 between the vapor space in the secondary boiler and the upper part of the secondary receiver 50, and a liquid supply line 54 between the lower part of the secondary receiver 50 and the lower part of the secondary boiler. This last circuit may be designated as a secondary boiler circuit.

The primary boiler circuit may be charged with mercury or other equivalent liquid, and water or other equivalent liquid may be used as a refrigerating medium and throughout the remainder of the system. A valve controlled conduit 56 may be provided between the bottom of the secondary boiler and the return connection 32 to the primary boiler for returning to the primary boiler circuit any mercury which may have escaped therefrom into the secondary boiler circuit. In the primary boiler circuit, mercury is vaporized in the primary boiler 10 and such mercury vapor is forced at high velocity through the nozzle 58 of the primary injector, thereby entraining with such mercury vapor, refrigerant vapor from the evaporator and through the connection 34. The injector 14 includes a throat 60 reduced in cross section as compared with the cross section of the injector at the nozzle 58. As previously stated, the high velocity mercury vapor discharged from the nozzle 58 entrains with it refrigerant (water) vapor and both vapors are compressed in passing through the throat 60 to the first stage of pressure. In passing through the throat 60, the mercury is condensed and the heat thereof is transferred to the liquid in the secondary boiler 12 and around the primary injector 14. The condensed mercury is returned to the primary boiler through the connection 32. During the operation of the system, mercury in the primary boiler may stand to approximately the level 62 and mercury in the connection 32 may stand to approximately the level 64. The connection 32 may include a trap or leg 66 so as to prevent pressure in the primary boiler from backing the mercury up the connection 32.

At the beginning of a cycle, refrigerant, such as water, may stand to approximately the level indicated at 68 in the secondary boiler. In order for a system of this kind to operate efficiently, it is desirable that the liquid in the secondary boiler 12 be one which will boil at a much lower temperature than the liquid employed in the primary boiler circuit. Boiling of the liquid in the secondary boiler at a lower temperature than that at which liquid boils in the primary boiler may be effected by using a liquid in the secondary boiler circuit which boils at a lower temperature than the liquid employed in the primary boiler circuit, or boiling of the liquid in the secondary boiler at a lower temperature may be obtained by operating the secondary boiler at a lower pressure than the primary boiler. In the present instance, water or other equivalent liquid, which boils at a materially lower temperature than mercury, may be employed in the secondary boiler.

As previously indicated, the mercury vapor in the primary injector, upon condensing, gives up its heat to the liquid in the secondary boiler, thereby effecting the generation of vapor and pressure in the secondary boiler. The refrigerant vapor generated in the secondary boiler is conducted by connection 48 to the nozzle 70 of the secondary injector 16 and such vapor is forced through the nozzle, entraining with it vapor from the primary injector 14, through the connection 36. In the secondary injector, the vapor supplied through the connection 36 is compressed to a second stage or condenser pressure and is thence conducted by means of connection 38 to the condenser 18. In the condenser and under the pressure to which the vapor therein is subjected, such vapor will condense into a liquid form and be collected in the receiver 40. As illustrated, the condenser 18 may be air cooled and provided with fins 72 to expedite the dissipation of heat from the refrigerant in the condenser.

As previously indicated, liquid refrigerant is supplied from the receiver 40 through connection 42 to the evaporator. Liquid refrigerant also is supplied from the receiver 40 to the secondary receiver 50 through connection 74 controlled by a check valve 76.

For returning liquid to the secondary boiler, a transfer device is employed which consists of the valve controlled vent connection 52 between the vapor space in the secondary boiler and the upper part of the secondary receiver 50 and the liquid supply line 54 between the bottom of the secondary boiler and the secondary receiver. The liquid supply line 54 includes a check valve 76' which permits flow of liquid from the receiver 50 but prevents return flow of liquid thereto.

During the operation of the system, the vent connection 52 normally is closed by a valve such as a needle valve 78. The needle valve 78 includes a seat 80 and a movable needle valve member 82, which is mounted for vertical movement in a bracket 84 and includes the limit stop shoulder 82a. The valve 78 is operated or controlled by a float actuated snap acting mechanism which includes a float 86, link 88, spring 90 and lever 92. The float 86 is mounted for vertical movement within the secondary boiler and is adapted to float in the liquid therein. An arm 87, carried by the float, has a pivotal connection with one end of the link 88, the other end of which is pivoted to a fixed bracket. The lever 92 has a fixed pivot 94 and one end of the lever is engageable with a collar 96 provided on the end of the valve member 82 and the other end of the lever 92 and finger 98 on link 88 cooperate with the spring 90 in such a way that when the finger 98 crosses a line between the pivot 94 and the pivot 96 of link 88, the spring will snap the lever 92 in a clockwise direction and open the valve 78. There will be no movement of the valve member 82 until the finger 98 drops below the line between the pivots 94 and 96, when the spring will suddenly snap the lever 92 from one position thereof to the other and thereby open the valve 78. Of course, lowering of the float 86 will cause movement of the finger 98 so that when the level of liquid within the secondary boiler reaches a predetermined low level, the valve 78 will be opened. Opening of the valve 78 will vent the vapor space in the secondary boiler to the upper part of the secondary receiver and thereupon liquid will flow by gravity from the secondary receiver 50 through the liquid supply line 54 to the lower part of the secondary boiler. When the level of the liquid in the secondary boiler again reaches the level indicated at 68, the float 86 will actuate the snap acting mechanism so as to close the valve 78, the closing movement of the valve member 82 being effected by reverse operation of the snap acting mechanism. The connections 52 and 54 may be of such capacity that the valve 78 need only remain open a very short time as compared with the time such valve is closed. Whatever vapor is delivered to the upper part of the secondary receiver 50 by the connection 52 will ultimately condense therein as the pressure in the secondary receiver will be condensing pressure and such receiver may be exposed to air for dissipating heat therefrom.

It will be observed that the primary injector is surrounded by a liquid in the secondary boiler so as to make possible the transfer of heat from the mercury vapor in the primary injector to the liquid refrigerant in the secondary boiler. The refrigerant or fluid which circulates through the secondary boiler circuit and through the evaporator circuit is the same, that is, water or other equivalent liquid. In the evaporator, which may consist of a liquid header 100 and the pair of headers 46 interconnected by a series of refrigerant ducts, the refrigerant, under the pressure to which it is subjected, will vaporize by absorbing heat from its environment and the refrigerant vapor will be supplied by connection 34 to the primary injector where it is subjected to the first stage of compression. As a matter of fact, the primary injector 14 actually functions to reduce the pressure within the evaporator 20, thereby permitting the evaporation of liquid therein.

The connection 56 between the lower part of the secondary boiler and the liquid return 32 to the primary boiler is controlled by a float valve 57 which will rise due to the accumulation of liquid mercury in the bottom of the secondary boiler. The valve 57 may be of solid metal or some other construction so as not to float in water.

It is to be understood that the invention is not to be considered as limited to the embodiment and application thereof selected for the purpose of illustration, but is intended rather to embrace and include all other embodiments and applications of the new and useful principles thereof which are to be considered reasonably within the scope of the appended claims.

What I claim as my invention is:

1. Refrigerating apparatus comprising a primary boiler circuit which includes a primary boiler, a primary injector, the nozzle of which is supplied with fluid under pressure from said boiler, a connection for returning fluid from said injector to said boiler and means for heating fluid in said boiler, a secondary boiler circuit which includes a secondary boiler, a secondary injector, the nozzle of which is supplied with fluid under pressure from said secondary boiler, a condenser and primary and secondary receivers and means for periodically effecting the transfer of fluid between said secondary boiler and said secondary receiver, an evaporator circuit which includes a vapor connection to said primary injector and a liquid connection to said primary receiver, the throat of said primary injector being arranged within said secondary boiler for effecting transfer of heat between fluid passing through said throat and fluid in said secondary boiler and a vapor connection between said primary injector and said secondary injector for supplying refrigerant vapor under pressure to said secondary injector.

2. Refrigerating apparatus comprising an evaporator, a pair of injectors arranged so that refrigerant vapor from said evaporator is forced through said injectors in series, a condenser connected to receive refrigerant vapor from said injectors, receiver means connected to said condenser and supplied with liquid refrigerant therefrom, said receiver means being adapted to supply liquid refrigerant to said evaporator and a boiler for one of said injectors connected to said receiver means so as to be periodically supplied with liquid refrigerant therefrom.

3. In a refrigerating system, an evaporator, an injector, a condenser and a receiver connected in series and so that refrigerant vapor is supplied to said injector from the evaporator, a boiler arranged between said injector and said receiver, means for periodically effecting the direct transfer of fluid between said receiver and said boiler and means for supplying fluid under pressure from said boiler to the nozzle of said injector.

4. Refrigerating apparatus comprising a condenser, receiver means, an evaporator connected to said receiver means so as to be supplied with liquid refrigerant therefrom, an injector connected to said evaporator so as to be supplied with vaporous refrigerant therefrom, a boiler connected to said injector for supplying fluid under pressure to the nozzle thereof, a connection between said injector and said condenser, a vent connection between the upper part of said boiler and said receiver means, a liquid connection between said boiler and receiver means, a check valve in said liquid connection which prevents flow of fluid from said boiler to said receiver means and a float operated valve in said boiler for controlling said vent connection.

5. Refrigerating apparatus comprising an injector, a condenser and an evaporator connected in series so that the injector during the operation thereof will exhaust refrigerant vapor from said evaporator, liquid receiving means arranged in a connection between said condenser and said evaporator, a second liquid receiving means comprising a boiler and connected with the nozzle of said injector for supplying fluid under pressure thereto and means for periodically effecting the transfer of fluid between said liquid receiving means and which comprise a fluid connection therebetween and a float controlled valve operable responsive to changes in the fluid level in one of said receiving means for controlling the flow of fluid through said fluid connection.

6. A refrigerating system comprising an evaporator, a primary injector connected to said evaporator so as to be supplied with vaporous refrigerant therefrom and a second injector connected to said primary injector so as to be supplied with vaporous refrigerant therefrom, means for vaporizing and supplying a fluid having a relatively high boiling point to the nozzle of said primary injector for effecting compression of said refrigerant vapor by said injector, a boiler containing fluid having a relatively low boiling point and connected to the nozzle of said secondary injector for supplying fluid under pressure thereto, said secondary injector withdrawing said compressed refrigerant from said primary injector and further compressing the same, said primary injector being in heat exchange relation to said boiler, and means connecting said second injector with said evaporator for supplying refrigerant thereto comprising a condenser and a receiver in series in the order named.

7. In a refrigerating system comprising an evaporator, means defining a closed circuit including said evaporator and including a plurality of injectors connected in series and functioning to successively raise the pressure of a refrigerant withdrawn from said evaporator, a separate boiler circuit for supplying fluid under pressure to each of the nozzles of said injectors, a first one of said circuits being charged with a fluid having a boiling point materially higher than the fluid with which a second one of said boiler circuits is charged, said injector supplied with said higher boiling point fluid being positioned in heat exchange relation with said boiler circuit for said other lower boiling point fluid, for effecting the transfer of heat between said higher boiling point fluid through said injector to said lower boiling point fluid.

8. In a refrigerating apparatus comprising an evaporator, means defining with said evaporator a closed circuit including in series a first injector for receiving vaporous refrigerant from said evaporator and raising the pressure thereof to a first value, a second injector for receiving said compressed refrigerant from said first injector and increasing the pressure thereof to a second value, a condenser receiving said refrigerant from said second injector, and a refrigerant receiver having an inlet connected with said condenser and an outlet connected with the inlet of said evaporator, means defining a first boiler circuit charged with mercury and operable for supplying vapor therefrom under pressure to the nozzle of said first named injector, means defining a second boiler circuit charged with water and operable for supplying the vapor thereof under pressure to the nozzle of said second named injector, and means responsive to the level of water in the boiler of said second named boiler circuit for effecting the transfer of fluid from said receiver means to said boiler.

EARL F. HUBACKER.